Patented Oct. 18, 1949

2,485,197

UNITED STATES PATENT OFFICE 2,485,197

DYESTUFF MIXTURES AND PROCESS OF MAKING SAME

Paul Grossmann, Binningen, Switzerland, assignor to Ciba Limited, Basel, Switzerland, a Swiss firm No Drawing. Application May 4, 1945, Serial No. 592,063. In Switzerland May 24, 1944

7 Claims. (Cl. 260—380)

It is generally known in organic chemistry that most types of reaction are far from giving a quantitative yield of the desired product. In view of this common fact it is mostly indispensable to purify the resulting raw products by appropriate measures and sometimes it is even necessary to use purified starting materials for a chemical process because otherwise too many undesired by-products or an excessive quantity thereof are obtained along with the desired product. The chemical industry is of course endeavouring to find suitable conditions of working in every instance in order to minimize the amount of undesired by-products produced by the reaction. But even if such conditions of working have been found some purifying treatment is nevertheless necessary in many instances because very slight deviations of the prescriptions often lead to strongly varying amounts of by-products.

It is further known in the chemical industry that the requirements of the trade are very severe in that a manufacturer must furnish a certain dyestuff, once placed upon the market, always in exactly the same quality both in shade and in strength. Obviously varying amounts of by-products, even if these by-products were not objectionable per se, would cause differences between different batches of the same dyestuffs and would therefore be objectionable because of the nonconformity of a later supply with a previous one. For this reason too it is necessary to purify the raw dyestuffs.

In the field of acetate rayon dyestuffs it is known that improved tinctorial results are sometimes obtained if mixtures of dyestuffs are applied to the fiber. If such mixtures are marketed by the manufacturers it is indispensable that the said mixtures always contain the same amounts of the same components because otherwise there would be no conformity with prior manufactures.

The present invention is concerned with dyestuff mixtures containing various components of the anthraquinone series. More particularly it provides such mixtures which are suitable for dyeing acetate rayon (this term including rayons made from cellulose esters and ethers in general, such as cellulose acetate, propionate, butyrate, benzyl-cellulose, etc. and mixtures thereof and superpolyamide and similar fibers and still more particularly the present invention provides dyestuff mixtures suitable for dyeing strong blue shades such as navy blues. Such mixtures can be obtained in a reliable manner without purifying treatments otherwise deemed necessary in the manufacture of dyestuffs.

According to this invention valuable dyestuff mixtures are obtained by reacting mixtures of $\alpha:\alpha$ - dihydroxy - anthraquinones containing the hydroxy groups in different benzene nuclei and further two negative substituents of which such a portion is in $\beta$-position as is usually obtained in substituting reactions, with agents known to be capable of transforming the said negative substituents partly into substituted and partly into primary amino groups.

The mixtures used for the present process may contain, for example, 1:5- and 1:8-dihydroxyanthraquinone derivatives in approximately equal portions or in portions which differ not more than 5-times from one another. Such mixtures can be obtained in a very simple manner by causing substituting agents to act on anthraquinone or its derivatives which are suitable for the indirect introduction of hydroxyl groups, and converting the substituents in question into hydroxyl groups while foregoing the separation of isomers. Examples of such substituting agents are sulfonating and especially nitrating agents.

When nitrating anthraquinone in the usual manner until 2 nitro groups enter into the compound there is obtained, for example, mainly a mixture of 1:5- and 1:8-dinitroanthraquinone in addition to smaller quantities of $\alpha:\beta$- and very small quantities of $\beta:\beta$-isomers. Also the sulfonation can be so conducted that preponderating quantities of 1:5- and 1:8-disulfonic acids are formed. The resulting disubstituted anthraquinones can be converted in known manner into dihydroxyanthraquinone mixtures consisting mainly of a mixture of 1:5- and 1:8-dihydroxyanthraquinone.

The negative substituents further necessary in the present starting materials can be introduced into the anthraquinone molecule again in known manner by substituting reactions. As negative substituents suitable for the conversion into amino groups—exchange reactions falling also under consideration—there may be named, for example, halogens and particularly nitro groups. Suitable starting materials for the present process can be obtained in a simple manner by nitrating dialkoxy - anthraquinones—producible from the afore-mentioned dinitroanthraquinones by reaction with solutions consisting of alcohol and caustic alkali—until two nitro groups enter into the dialkoxyanthraquinones, while the nitro groups occupy $\beta$-positions to a certain extent, and saponifying the alkoxy groups in known manner. The saponification can be conducted preferably under such conditions that only the alkoxy groups in α-position are saponified, while these in β-position remain unchanged. In such a case the mixtures of 1:5- and 1:8-dihydroxy-dinitroanthraquinones used as starting materials still contain a portion of α-hydroxy-β-alkoxy-dinitroanthraquinones.

The mixtures used as starting materials may contain, in addition to the twice negatively substituted 1:5- and 1:8-dihydroxy-anthraquinones, still small quantities of differently substituted anthraquinones, particularly such as are obtained as by-products in the manufacture of 1:5- and 1:8-dihydroxyanthraquinones. Besides, it is not necessary that each of the anthraquinone molecules present in the mixture contains furthermore two negative substituents, but it is sufficient if such is the case with the preponderating portion of the molecules present in the mixture.

According to a further modification of the present process there can be used as starting materials also mixtures of such α:α-dihydroxyanthraquinones which are derived, for example, from technically pure or also perceptibly impure 1:8- or 1:5-dihydroxyanthraquinones. Such mixtures are obtained preferably by nitrating technically pure 1:8- or 1:5-dimethoxyanthraquinones (or other α:α-dihydroxyanthraquinones wherein the hydrogen of the hydroxyl group is replaced by a substituent) and subsequently splitting off the O-substituent. When using mixtures which contain, in addition to 1:5- or 1:8-dialkoxyanthraquinones, also α:β-dialkoxyanthraquinones, there can also be obtained mixtures of starting materials which contain, in addition to the twice negatively substituted α:α-dihydroxyanthraquinones, also twice negatively substituted α-hydroxy-β-alkoxyanthraquinones. Since in the manufacture of intermediate products of the anthraquinone series the 1:5- and 1:8-compounds which are formed simultaneously are frequently separated, as for certain purposes only one of the two compounds is suitable, anthraquinone derivatives which are easily convertible into technically pure 1:8- or 1:5-dihydroxy- or dialkoxy-anthraquinones, such as 1:8-dinitroanthraquinone or anthraquinone-1:8-disulfonic acid, are occasionally obtained in considerable quantity as by-products which can be utilized only sparingly.

When introducing negative substituents, for example, nitro groups into technically pure α:α-dihydroxy- or preferably -dialkoxyanthraquinones there are obtained mixtures of twice negatively substituted α:α-dihydroxy- or -dialkoxy-anthraquinones in which the negative substituents generally occupy the majority of the remaining α-positions, but also enter into the β-positions in remarkable portions.

Now the present process consists in converting in the said starting materials the two negative substituents partly into substituted amino groups, preferably secondary amino groups, and partly into primary amino groups. Depending on the character of the negative substituents and on the intended secondary amino groups, such conversion can be carried out either by means of an exchange reaction, or in the case of nitro groups by means of a reduction, if desired, with subsequent substitution of the resulting primary amino groups, or also by using a combination of the various methods of working.

For example, dihydroxydinitroanthraquinones can be reacted first of all with amines, for example, arylamines, especially of the benzene series, such as aniline, toluidines, anisidines, para-aminophenol or para-phenylenediamine, until the nitro groups are partially exchanged for arylamino radicals, and the remaining nitro groups reduced in usual manner to amino groups, for example, by treating with alkali sulfides. Dihydroxy-dinitroanthraquinones can also be at first completely reduced to dihydroxydiaminoanthraquinones and part of the resulting amino groups then converted into substituted amino groups by partial treatment with substituting agents. As substituting agents there come particularly under consideration alkylating agents, for example, methylating or ethylating agents, such as methanol or ethanol, alkyl halides, hydroxy alkyl halides, such as ethylene chlorohydrin glycerol chlorohydrin or aralkylating agents, for example, benzylating agents, such as benzyl chloride. If desired, a partial reduction with subsequent complete or partial reaction of the remaining nitro groups or of the newly formed amino groups may be effected, or the indicated methods of working used in a different combination. The substituents in the secondary amino groups may thus belong to the aryl alkyl or aralkyl series but it is preferable to select them to contain not more than ten carbon atoms.

By suitably selecting the conditions of working, such as temperature and duration of the reaction, or by using such quantities of reacting substances which are not sufficient for the complete reaction, it is easily possible to take care that only part of the negative groups present in the starting materials is converted into or replaced by substituted amino groups, and another part (preferably all remaining negative substituents) is converted into primary amino groups or replaced by such groups. It is, however, not necessary, that each anthraquinone molecule undergoes partial reaction. Partial reaction will readily occur in those molecules in which the negative substituents possess a different reactivety among themselves (for example, on account of different positions). Certain molecules present in the mixture, however, may undergo complete reaction, while others remain unchanged. The conditions are preferably selected in such a manner, that on an average less than half, for example 10 to 40 per cent. of secondary amino groups are formed.

In view of the difficulties in exhaustively analyzing such mixtures which are often of rather complex nature the relative amounts of the different components therein can hardly be estimated with accuracy. According to present knowledge it is believed that they contain at least some amount of diamino-dihydroxy-anthraquinones of the formulae

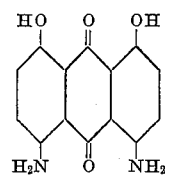

and/or

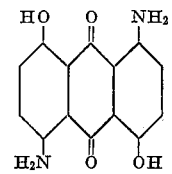

and some amount of dihydroxy-amino-secondary aminoanthraquinones of the formulae

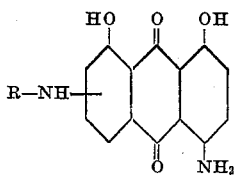

and/or

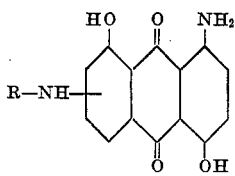

wherein the R—NH-substituent occupies a β-position since β-standing nitro or amino groups appear to be more reactive in reactions of the kind specified above. Depending on the amount of secondary amino groups present in the average of the mixture α-standing R—NH-substituents will also occur.

Mixtures of aminohydroxyanthraquinone compounds appear to be preferable which contain the following components

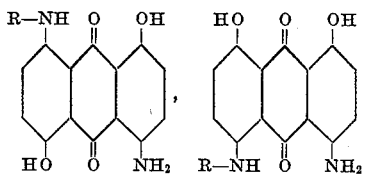

and

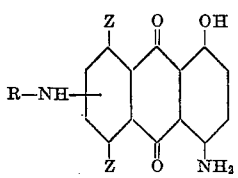

wherein one Z stands for OH and the other Z for hydrogen, if in at least 20 per cent. of all molecules R stands for an aromatic, aliphatic or araliphatic radical containing at most 10 carbon atoms and in the remaining molecules R stands for hydrogen. More particularly mixtures of the above kind appear to be well suited which contain the compounds (1)
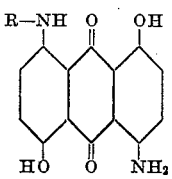

(2)
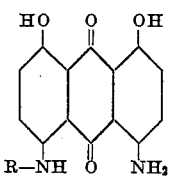

(3)
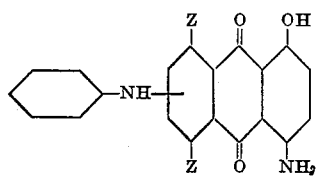

wherein one Z stands for OH and the other Z for hydrogen and wherein in at least 10 per cent. of all molecules of (1) and (2) R stands for a phenyl radical and in the remaining molecules R stands for hydrogen.

The same dyestuffs are obtained by modifying the present process in such a manner that mixtures of ethers and esters of the above indicated twice negatively substituted dihydroxy-anthraquinones are used as starting materials, converting therein the negative substituents partly into substituted amino groups and partly into primary amino groups, and saponifying the ether or ester groups, especially alkoxy groups, in a separate operation. This saponification can take place, for example, after both nitro groups in mixtures of dialkoxy-dinitroanthraquinones are reduced to amino groups, or, if desired, still later, for instance, after a partial alkylation of the formed amino groups has been affected.

When carrying out the above indicated reactions it is in most cases not only not disadvantageous, but actually advantageous if the separation of isomers and the like is dispensed with and the whole preparation further worked up. In this manner there are obtained not only better yields, but also better mixtures of the final products.

According to a preferred modification of the present process a mixture is used as starting material which is obtained by replacing the nitro groups in a mixture of isomeric dinitroanthraquinones obtainable directly by nitrating anthraquinone, by alkoxy groups, especially methoxy groups, nitrating this mixture again until two nitro groups have entered, and thereupon saponifying the alkoxy groups standing in α-position. This mixture which contains, besides dinitrated 1:5- and 1:8-dihydroxyanthraquinones, also dinitrated α-hydroxy-β-alkoxyanthraquinones, can be subjected, as mentioned above, either to a partial reaction with amines, particularly aniline, and the resulting mixtures can then be reduced. Such mixtures can also be reduced to the corresponding diaminoanthraquinones and then partially alkylated, especially methylated, or treated partially with aralkylating agents, for example, with a quantity of benzylchloride which is not sufficient for bringing about a complete reaction.

The dyestuff mixtures obtained according to the present process are suitable for dyeing various materials, such as masses, lacquers, spinning solutions and artificial polymerization products, especially, however, for dyeing and printing textile fibers, preferably fibers from cellulose esters and -ethers, such as cellulose acetate and cellulose acetate propionate, benzyl cellulose and fibers made from superpolyamides and the like. Mostly navy blue shades of good color strength and good fastness to light are thus obtained.

The following examples illustrate the invention, the parts being by weight:

*Example 1*

6.6 parts of crude dihydroxydinitroanthraquinone containing some hydroxymethoxydinitroanthraquinone are dispersed in the form of an aqueous paste in 30 parts of water. 5 parts of aniline are added and the whole is heated for 1 to 1½ hours at 95° C. It is allowed to cool to about 50° C., 15 parts of sodium hydrosulfide of 27 per cent strength are added, the mixture is heated for ½ hour to the boil and the aniline in excess is expelled with steam. 4 parts of sodium bicarbonate are added at about 70° C., the mixture is thoroughly mixed and the precipitated dyestuff is removed by filtration. It is washed until neutral and after drying there are obtained about 6 parts of a dyestuff mixture which dissolves in concentrated sulfuric acid to a yellow brown solution which changes over red violet to blue violet on gentle heating with boric acid and over green into green blue on heating with paraformaldehyde, and dyes acetate rayon navy blue shades.

When using 5.5 parts of para-aminophenol instead of 5 parts of aniline, a similar somewhat bluer dyestuff is obtained.

The crude dihydroxydinitroanthraquinone used in the present example can be obtained as follows: The dinitroanthraquinone which is not purified, obtained by dinitrating anthraquinone, is converted into dimethoxyanthraquinone by treating with a methylalcohol solution of caustic potash. The resulting product is dinitrated and the methoxy groups are saponified by treating with concentrated sulfuric acid, whereby the β-standing methoxy groups remain unchanged.

Example 2

The dihydroxydinitroanthraquinone mentioned in the third paragraph of Example 1 is reduced to a mixture of isomeric dihydroxydiaminoanthraquinones by boiling with an aqueous solution of sodium hydrosulfide in excess. 20 parts of this mixture are dispersed in 80 parts of sulfuric acid of 94 per cent strength and after addition of 35 parts of methyl alcohol heated for 3 hours to 135° C. After cooling the solution is poured into much cold water, the precipitated dyestuff is filtered, washed until free from acid, and after drying there are obtained about 20 parts of a dyestuff mixture which dissolves in concentrated sulfuric acid with a red brown coloration which is changed into red violet on gentle heating with boric acid, into green blue on heating with paraformaldehyde, and dyes acetate rayon violet blue shades.

A mixture of isomeric dihydroxydiamino-anthraquinones which is very similar to that described in the first sentence of this example, can also be obtained by brominating a crude mixture of about equal parts of 1:5- and 1:8-dihydroxyanthraquinone until 2 bromine atoms enter into the compound, eliminating both bromine atoms by condensation with paratoluene sulfamide and removing the two para-toluene sulfo groups of the resulting dihydroxy-di-(para-toluenesulfamido)-anthraquinone by saponification. When further proceeding as indicated above there is obtained a similar dyestuff.

When reducing the dimethoxydinitroanthraquinone mentioned in the third paragraph of Example 1 by boiling with an excess of sodium hydrosulfide and then saponifying the methoxy groups, there is also obtained a very similar mixture of isomeric dihydroxydiaminoanthraquinones which can be worked up as indicated above.

Example 3

10 parts of a crude mixture from dinitroanthrarufine and dinitrochrysazine are dispersed in 25 parts of aniline and heated for 1 hour to 70° C. After cooling there is added a mixture of 30 parts of concentrated hydrochloric acid and 50 parts of water, the whole is filtered, the residue washed until neutral and reduced by introducing it into a solution of 30 parts of sodium hydrosulfide of 27 per cent strength in 70 parts of water. The mixture is boiled for one hour under reflux, then cooled to 70° C., whereupon 8 parts of sodium bicarbonate are added, the whole is filtered and the residue washed until neutral. There are obtained about 8.7 parts of a dyestuff mixture dissolving in concentrated sulfuric acid with a yellow brown coloration which is changed to blue violet on gentle heating with boric acid, to blue on heating with paraformaldehyde, and dyes acetate rayon blue shades.

The mixture used in the present example can be obtained as follows: A mixture of about equal parts of 1:5- and 1:8-dimethoxyanthraquinone is nitrated until 2 nitro groups enter into the compound; the methoxy groups are then saponified by heating in concentrated sulfuric acid.

Example 4

The mixture of dinitroanthrarufine and dinitrochrysazine used in Example 3 is reduced with an excess of sodium hydrosulfide to the mixture of the corresponding diamino compounds. 13.5 parts of this crude mixture are dispersed in 30 parts of crude cresol and heated during 40 minutes to 80° C. after addition of 4 parts of benzyl chloride and 3 parts of anhydrous sodium carbonate. The cresol is then distilled with steam, the resulting aqueous suspension is filtered and about 15 parts of a dyestuff are obtained which dissolve in sulfuric acid with a yellow brown coloration which is changed to red-violet on gentle heating with boric acid, to green blue on heating with paraformaldehyde, and dyes acetate rayon blue shades.

Example 5

Crude dinitrochrysazine is converted in known manner into the corresponding diaminochrysazine by reduction with sodium sulfide.

10 parts of this crude diaminochrysazine in 22 parts by volume of concentrated sulfuric acid are heated for 2 hours to 135–140° C. with 15 parts by volume of methyl alcohol, and worked up as indicated in Example 2. The dyestuff dissolves in sulfuric acid with a yellow brown coloration which is changed to red brown on gentle heating with boric acid, to a dirty violet on heating with paraformaldehyde, and dyes acetate rayon blue shades.

The crude dinitrochrysazine used in the present example can be obtained by nitrating 1:8-dimethoxyanthraquinone until two nitro groups enter into the compound and subsequent saponification of the methoxy groups.

Example 6

1.5 parts of the dyestuff obtained according to Example 1 first paragraph are made into a paste in the usual manner. To the paste of about 20 per cent strength there are added about 100 parts of a soap solution of 60° C. made with soft water and containing 2 grams of soap per liter of water, the whole is thoroughly mixed and poured into a dyebath of 3000 parts of soft water containing 6 parts of soap. 100 parts of wetted acetate rayon are entered at 40° C., the temperature is gradually raised to 80° C. and dyeing is conducted for 1 hour at 80° C. The material is then rinsed and finished as usual. The acetate rayon is dyed powerful navy blue shades fast to light.

What I claim is:

1. Process for the manufacture of a dyestuff mixture suitable for dyeing acetate rayon according to the dispersion dyeing method, comprising reacting a mixture of α:α-dihydroxyanthraquinones consisting of a single anthraquinone nucleus containing the hydroxyl groups in different benzene nuclei and further two nitro groups in such positions as are occupied in direct nitrating reactions, with an arylamine under conditions for exchanging only part of the said nitro groups for arylamino radicals, and reducing the remaining part of the nitro groups to amino groups.

2. Process for the manufacture of a dyestuff mixture suitable for dyeing acetate rayon according to the dispersion dyeing method, comprising reacting a mixture of $\alpha:\alpha$-dihydroxy-anthraquinones consisting of a single anthraquinone nucleus containing the hydroxyl groups in different benzene nuclei and further two nitro groups in such positions as are occupiied in direct nitrating reactions, with a reducing agent for reducing the said nitro groups to amino groups, and reacting the resulting mixture with an agent for transforming primary amino groups into secondary amino groups, under conditions for only partially effecting the said transformation.

3. Process for the manufacture of a dyestuff mixture suitable for dyeing acetate rayon according to the dispersion dyeing method, comprising reacting a mixture of $\alpha:\alpha$-dihydroxy-anthraquinones consisting of a single anthraquinone nucleus containing the hydroxyl groups in different benzene nuclei and further two nitro groups in such positions as are occupied in direct nitrating reaction, with a reducing agent for reducing the said nitro groups to amino groups, and reacting the resulting mixture with an alkylating agent for transforming primary amino groups into secondary amino groups, under conditions for only partially effecting the said transformation.

4. Process for the manufacture of a dyestuff mixture suitable for dyeing acetate rayon according to the dispersion dyeing method, comprising reacting a mixture of $\alpha:\alpha$-dihydroxy-anthraquinones consisting of a single anthraquinone nucleus containing the hydroxyl groups in different benzene nuclei and further two nitro groups in such positions as are occupied in direct nitrating reactions, with a reducing agent for reducing the said nitro groups to amino groups, and reacting the resulting mixture with an aralkylating agent capable of transforming primary amino groups, into secondary amino groups, under conditions for only partially effecting the said transformation.

5. Process for the manufacture of a dyestuff mixture suitable for dyeing acetate rayon according to the dispersion dyeing method, comprising a mixture of dihydroxy-dinitroanthraquinones—which are obtained by dinitrating anthraquinone, replacing the said nitro groups by alkoxy groups, dinitrating again and saponifying the $\alpha$-alkoxy groups—with aniline under conditions for only partially replacing the nitro groups, and reducing the remaining nitro groups to amino groups.

6. A mixture obtained according to the process of claim 1.

7. A mixture obtained according to the process of claim 5.

PAUL GROSSMANN.

REFERENCES CITED

The following references are of record in the file of this patent:

UNITED STATES PATENTS

| Number | Name | Date |
|---|---|---|
| 1,699,419 | Zahn et al. | Jan. 15, 1929 |
| 1,736,088 | Nawiasky | Nov. 19, 1929 |
| 1,828,588 | Bally et al. | Oct. 20, 1931 |
| 1,868,202 | Grossmann | July 19, 1932 |
| 1,881,752 | Lodge et al. | Oct. 11, 1932 |
| 1,903,862 | Grossmann | Apr. 18, 1933 |
| 1,969,735 | Ellis et al. | Aug. 14, 1934 |
| 2,053,274 | Ellis et al. | Sept. 8, 1936 |
| 2,053,278 | Ellis et al. | Sept. 8, 1936 |
| 2,068,371 | Buxbaum | Jan. 19, 1937 |
| 2,091,481 | Kranzlein | Aug. 31, 1937 |

FOREIGN PATENTS

| Number | Country | Date |
|---|---|---|
| 98,639 | Germany | July 12, 1898 |
| 163,042 | Germany | Sept. 16, 1905 |
| 798,911 | France | May 29, 1936 |
| 15,391 | Great Britain | 1900 |
| 420,593 | Great Britain | Dec. 5, 1933 |

OTHER REFERENCES

Schmidt et al., "Ber. Deutchen Ges.," vol. 29, pages 2940 and 2941 (1896).

Certificate of Correction

Patent No. 2,485,197 October 18, 1949

PAUL GROSSMANN

It is hereby certified that errors appear in the printed specification of the above numbered patent requiring correction as follows:

Column 1, line 50, after the word "thereof" insert a closing parenthesis; column 6, line 20, for "affected" read *effected*; column 10, line 7, before "a mixture" insert *reacting*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*